United States Patent [19]

Cusato et al.

[11] Patent Number: 5,406,453
[45] Date of Patent: Apr. 11, 1995

[54] COMPUTER CHASSIS PLANAR/RISER CARD ASSEMBLY

[75] Inventors: Richard L. Cusato; James D. Curlee, both of Austin, Tex.

[73] Assignee: Dell USA, L.P., Austin, Tex.

[21] Appl. No.: 41,090

[22] Filed: Apr. 1, 1993

[51] Int. Cl.$^6$ .............................................. H05K 5/00
[52] U.S. Cl. .................................. 361/733; 361/683; 361/731; 361/736; 361/796; 439/61
[58] Field of Search .................. 211/41; 312/294, 119, 312/215, 216; 361/683, 686, 796, 797, 803, 729, 730, 731, 733, 736; 364/708.1; 439/61; 455/348

[56] References Cited

FOREIGN PATENT DOCUMENTS 1-265599 10/1989 Japan ................................... 361/733

*Primary Examiner*—Leo P. Picard
*Assistant Examiner*—Donald A. Sparks
*Attorney, Agent, or Firm*—J. Richard Konneker; James Huffman; Brandi W. Sarfatis

[57] ABSTRACT

To improve the serviceability, manufacturability and uptime for a computer file server a specially designed planar/riser card assembly is mounted on the computer chassis and includes a card cage structure in which a riser card is secured. Carried on the riser card are I/O card edge connector sockets into which all of the system I/O cards may be plugged. The riser card is hard connected into the system and itself has an edge connector portion. The system planar board is carried on a mounting plate which is screwed to an outer side of the cage structure. A socket connector carried on the planar board receives the edge connector portion of the riser card, thereby electrically coupling the planar board to the riser card. The riser serves as a wiring plane containing only the signals which the planar board would normally provide to the I/O cards through "on planar" connectors. Removal of the planar board, without the necessity of first unplugging I/O cards and cables therefrom, is easily and quickly effected simply by unscrewing the mounting plate and outwardly pulling on it to remove the riser card edge portion from the planar board socket, thereby freeing the planar board from the balance of the system. Once a replacement planar board is secured to the mounting plate, this process is simply reversed to operatively install the new planar board.

11 Claims, 4 Drawing Sheets

COMPUTER CHASSIS PLANAR/RISER CARD ASSEMBLY

BACKGROUND OF THE INVENTION

The present apparatus generally relates to computer apparatus, and more particularly relates to apparatus and methods for removably securing a system planar board to a computer chassis and operatively connecting the planar board to other operating components of the computer.

The system planar board or backplane of a personal computer is generally recognized as the assembly which requires the most service, or system intervention, since it typically carries the least reliable components of the overall computer system such as the processor, memory and main bus. As conventionally incorporated in personal computers, system planers function as the base into which all other card assemblies are plugged. I/O and peripheral cabling may either be plugged directly into the planar or into the rear edge of a card assembly which plugs into the planar.

Since all of these cards require force to plug them into the planar, the planar must be firmly secured to the metal chassis portion of the computer and, together with its associated mounting structure, must be of a rather rugged construction. This typically requires that the planar be secured at multiple locations thereon to the computer chassis by screws before the other cards and cabling are plugged into the planar in a "layered" sequence and arrangement.

The reverse sequence is required when it subsequently becomes necessary to remove the planar for inspection, repair or replacement. Specifically, the I/O card cabling is removed from the I/O card rear edges, the I/O cards are removed, the planar I/O cabling is removed, and finally the hardware which secures the planar to the chassis is removed and the planar is withdrawn. Installation of a new planar on the computer chassis requires that these several steps be carried out in a reverse order.

Simply stated, this method of securing a system planar to a computer chassis, and electrically coupling the planar to other components of the computer, in effect "buries" the least reliable portion of the overall computer system beneath more reliable components which, despite the fact that they might not need any service whatsoever, must be laboriously removed (and tediously replaced) simply to gain access to the planar. Because of this attachment complexity, it is not unusual for the total time to effect planar changeout to be from ten to thirty minutes or more. Since the computer is down during planar changeout, such changeout is often costly and highly inconvenient.

One proposed approach to improving the accessibility of a system planar board is illustrated and described in pending U.S. patent application Ser. No. 07/967,903 filed on Oct. 27, 1992, now U.S. Pat. No. 5,338,214 entitled "Expansion Card/Riser Card Module for Desktop Computers", assigned to the assignee of the present invention. Disclosed in such pending application is an expansion card/riser card module in which a riser card is used as the coupling means for operatively connecting and disconnecting the supported expansion cards to and from the motherboard. The module includes a movable support structure that removably carries the riser card and the plurality of expansion cards for conjoing movement therewith. The riser card is operatively and removably coupled to the expansion cards and has a connection edge portion adapted to be removably received within a motherboard socket when the support structure is appropriately aligned over the socket and pushed against the motherboard.

While this approach to providing enhanced accessibility to a motherboard is seen to provide a substantial improvement over prior art computer system constructions, it still requires that the I/O cards, and their associated I/O cables, be moved before the system planar board can be disconnected and removed from the chassis.

It can readily be seen from the foregoing that it would be highly desirable to provide improved apparatus and methods for securing a system planar to a computer chassis, and electrically coupling the planar to the other computer system components usually associated therewith, to improve the serviceability, uptime and manufacturability of the computer with which the planar is associated. It is accordingly an object of the present invention to provide such improved apparatus and methods.

SUMMARY OF THE INVENTION

In carrying out principles of the present invention, in accordance with a preferred embodiment thereof, computer apparatus is provided which, due to a unique connection of its system planar board to the balance of the computer system, advantageously increases the manufacturability, serviceability and uptime of the computer.

The computer apparatus includes a chassis portion, a computer system portion carried by the chassis portion and including interconnected computer cards and cables, and a system planar board. Cooperating means on the system planar board and the computer system portion permit the planar board to be operatively coupled to and disconnected from the computer system portion, without moving the computer cards and cables, by respectively moving the system planar board toward and away from the chassis portion.

In a preferred embodiment of the computer apparatus the chassis structure has a mounting portion thereon, and a riser card is fixedly supported on the mounting portion. The riser card has a plurality of I/O connector sockets thereon, and a connector edge portion through which electrical signals may be transmitted to and from the riser card. Pluralities of I/O cards and cables are operatively plugged into the riser card connector sockets.

The preferred computer apparatus embodiment also includes a system planar board having an I/O connector socket mounted on a side thereof and removably receiving the riser card connector edge portion, thereby electrically coupling the planar board to the I/O cards and cables through the fixedly supported riser card. The system planar board is removably secured to a side of a mounting plate which, in turn, is removably secured to the chassis structure mounting portion in a manner captively retaining the card edge connector portion within the I/O connector socket of the system planar board.

When it becomes necessary to replace the system planar board, the mounting plate is simply unfastened from the chassis structure mounting portion and then pulled outwardly away therefrom to withdraw the riser card edge connector portion from the system planar board I/O connector socket and completely disconnect the planar board from the balance of the computer system without the necessity of moving any of the I/O cards or cables which remain in their original positions on the chassis structure during both planar board removal and replacement.

According to a feature of the invention, the planar board has mounted thereon a plurality of I/O connector devices to which external peripheral devices, such as a keyboard, monitor and a mouse, may be connected. Portions of these I/O connector devices are received in corresponding openings formed in an I/O output bracket member secured to the planar board and having a peripheral groove formed therein. When the mounting plate is moved toward the chassis structure mounting portion to cause operative entry of the riser card connector edge portion into the planar board I/O connector socket, a wall edge portion of the chassis structure enters the bracket groove and forms a labyrinth EMI seal therewith at the juncture between this wall edge portion and the I/O output bracket member.

DETAILED DESCRIPTION

Figure 1:
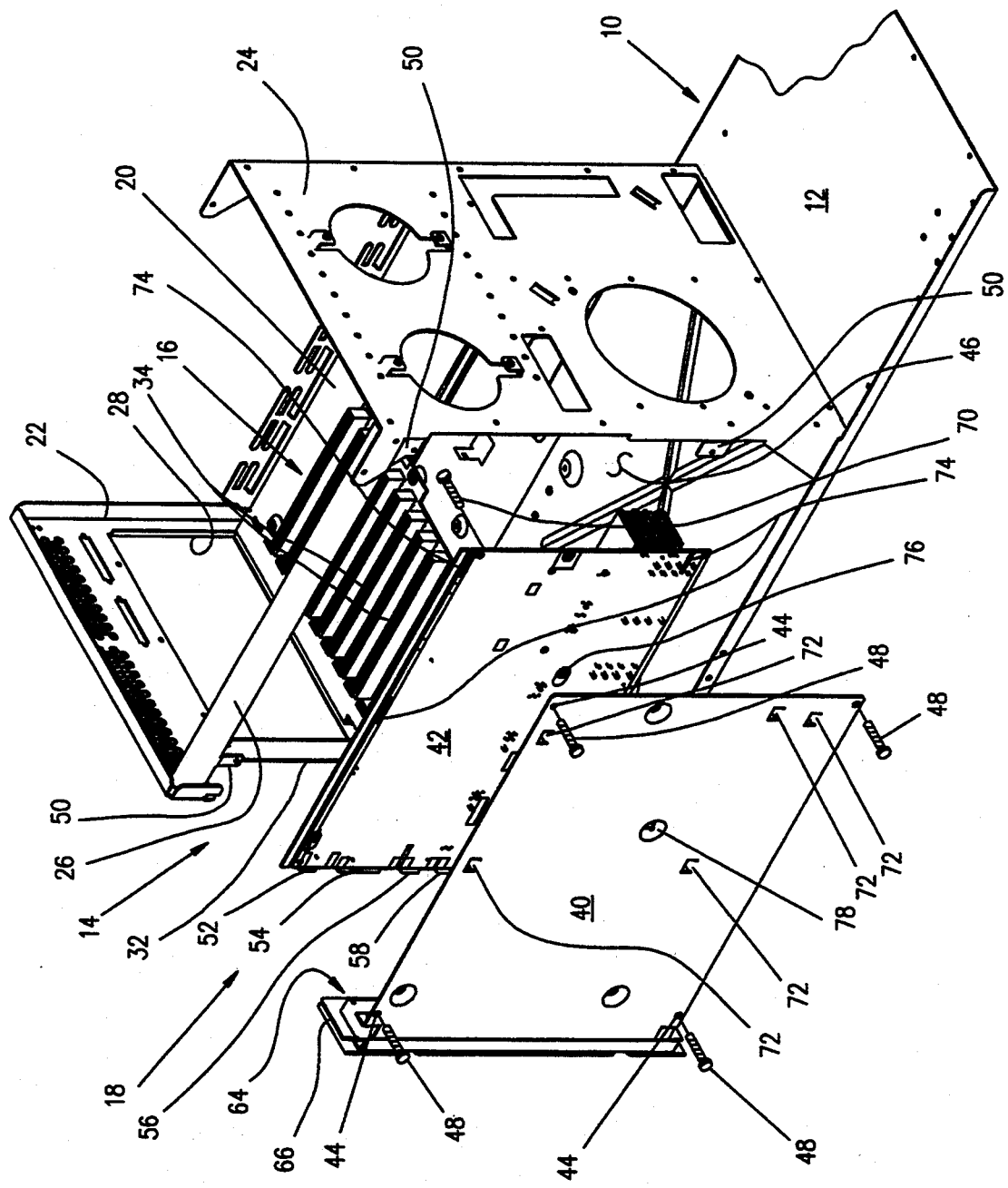
FIG. 1 is a partially exploded outer side perspective view of a specially designed planar/riser card assembly embodying principles of the present invention and operatively incorporated in a representative computer chassis.

Perspectively illustrated in FIGS. 1-4 is a chassis portion 10 of a personal computer, representatively a file server. Chassis portion 10 is of a sheet metal construction and includes an elongated rectangular base wall 12 upon which is supported a specially designed planar/riser card assembly 14 embodying principles of the present invention and including a riser card 16 and a planar subassembly 18.

Riser card 16 is supported atop a chassis wall 20 which extends parallel to and is upwardly spaced apart from base wall 12 and is secured at its opposite ends to central portions of a spaced pair of parallel chassis walls 22,24 which are transverse to and project upwardly from the base wall 12. Aligned corner portions of the walls 22,24 are fastened to the opposite ends of a bracing bar 26. Wall 22 has a rectangular opening 28 therein which receives a sheet metal card cage 30. For purposes later described, a generally rectangular cutout area 32 is formed in a vertical side edge of wall 22 adjacent the bar 26.

On its top side the riser card 16 has a series of I/O card edge socket connectors 34 (see FIG. 2) into which lower connector edge portions of a series of I/O cards 35 (shown in phantom) having vertical side edges inserted downwardly through the slots of card cage 30, may be operatively plugged to electrically couple such cards to the balance of the computer system via the riser card 16. The riser card is hard connected to the non-planar board components of the overall computer system by schematically depicted I/O cables 36 that extend inwardly through the slots of the card cage 30 and connect to the side edges of the I/O cards 35 therein.

Figure 2:
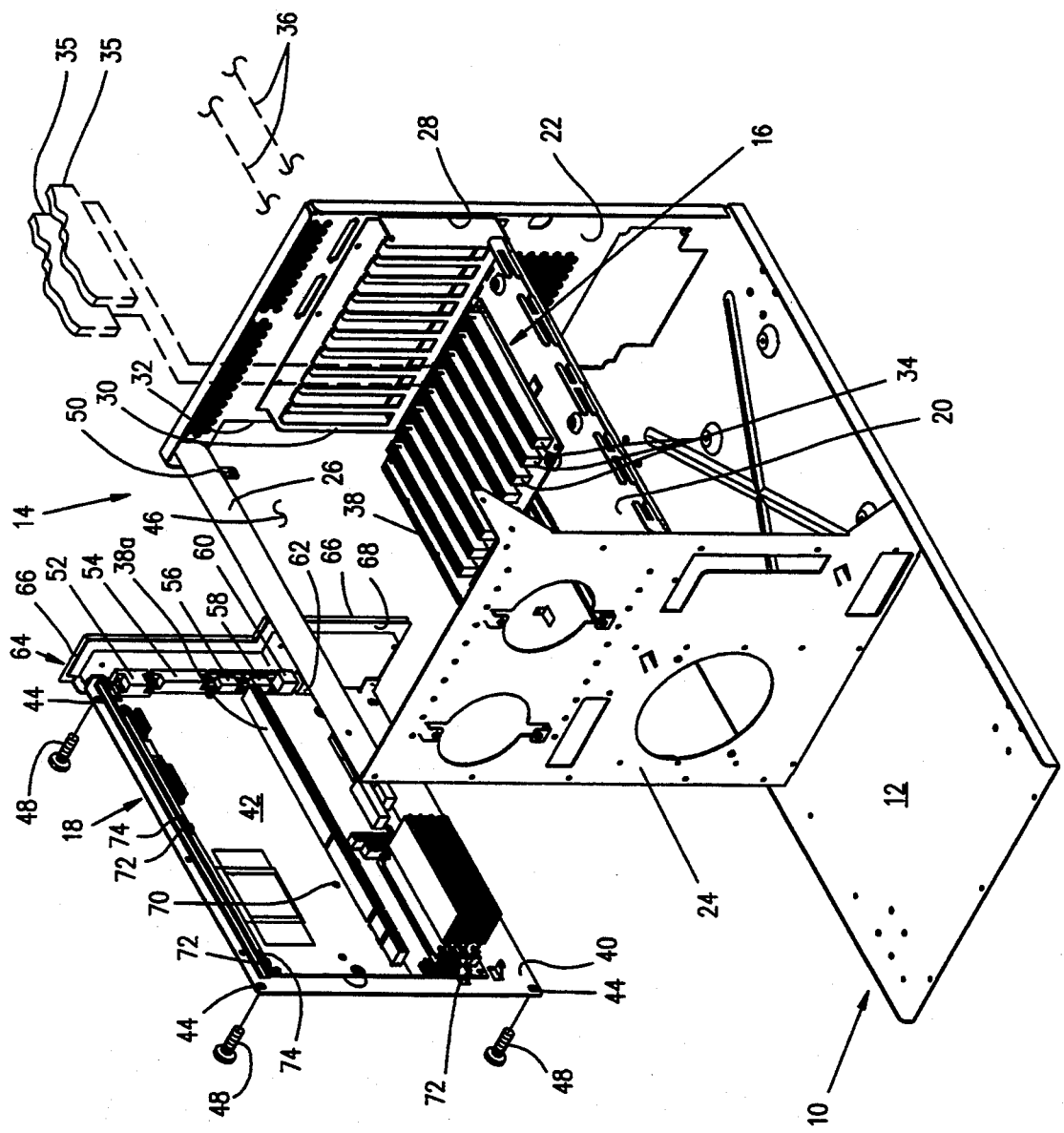
FIG. 2 is a partially exploded inner side perspective view of the planar/riser card assembly.
Figure 3:
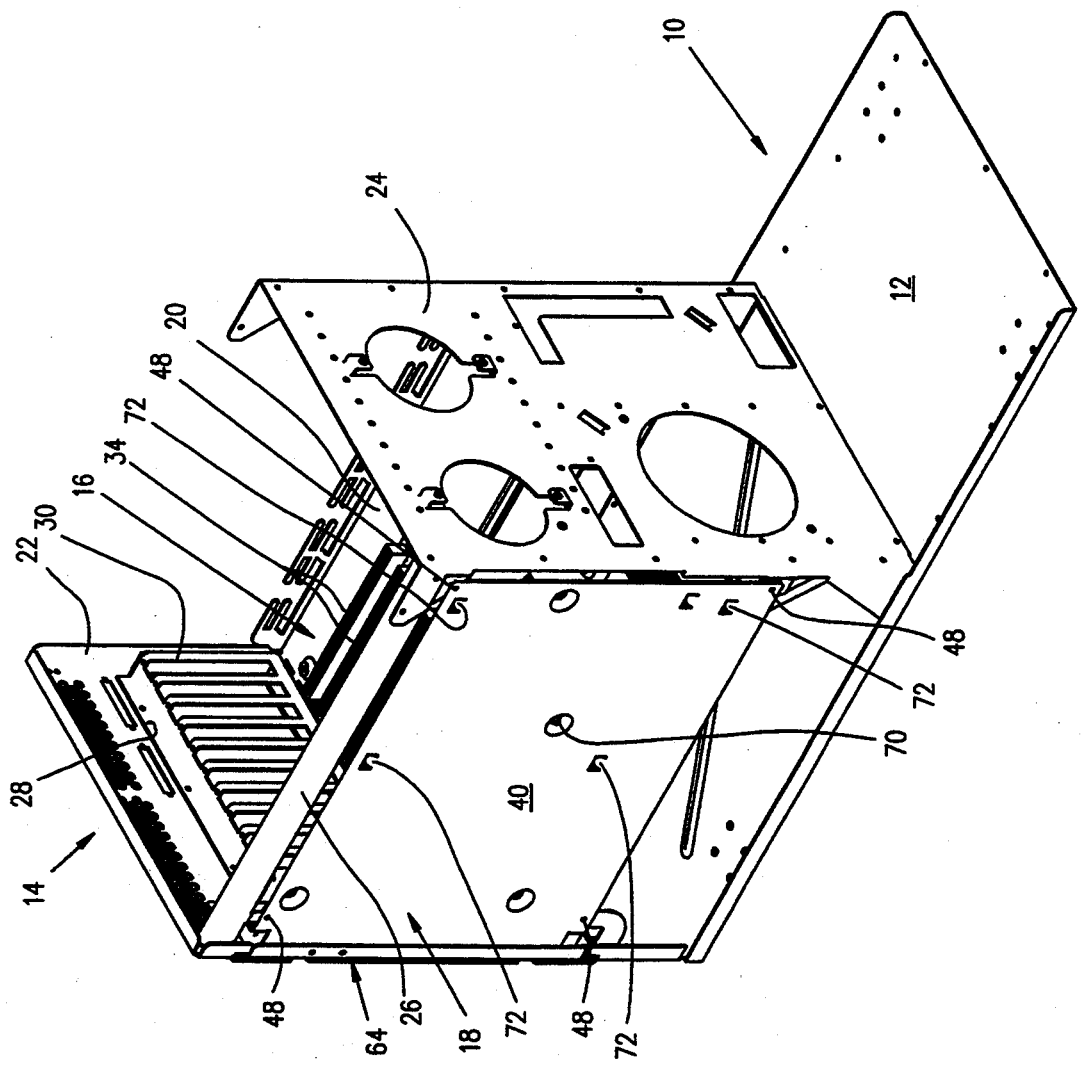
FIG. 3 is an assembled outer side perspective view of the planar/riser card assembly.
Figure 4:
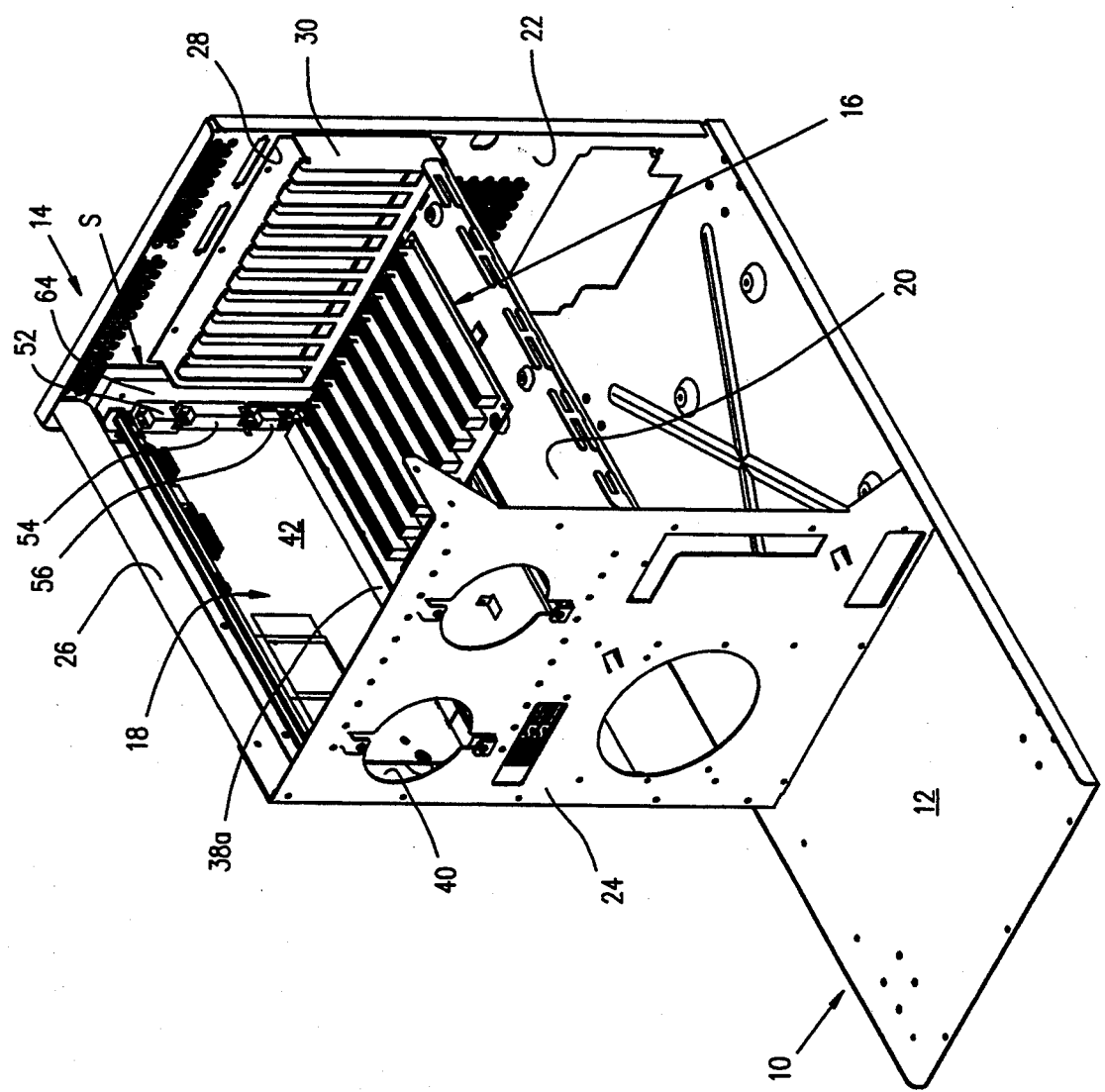
FIG. 4 is an assembled inner side perspective view of the planar/riser card assembly.

For purposes later described, as best illustrated in FIG. 2, the riser card 16 has a connector edge portion 38 that faces the planar subassembly 18.

The planar subassembly 18 includes a horizontally elongated rectangular metal mounting plate 40 and an elongated rectangular system planar board 42. Mounting plate 40 has a length generally equal to the distance between the vertical chassis walls 22 and 24 and has small circular mounting holes 44 formed through its corners. The mounting plate is removably secured to the chassis portion 10, over its open outer side 46 (see FIGS. 1 and 2), by means of four retaining screws 48 inwardly extended through openings 44 and threaded into corresponding openings formed in projecting tabs 50 disposed on the chassis portion 10 around its open side 46.

In addition to the other computer components mounted on the system planar board 42, such as a processor, memory chips and a bus structure, a series of I/O connector devices are mounted on an end edge portion of the planar board. These I/O connector devices, into which cables from external computer peripheral devices (such as a monitor, keyboard, mouse and the like) may be plugged representatively include, as can best be seen in FIG. 2, a monitor connector 52, a parallel port connector 54, two serial port connectors 56 and 58, a mouse connector 60, and a keyboard connector 62.

Via the circuitry of the planar board 42 the connectors 52-62 are operatively coupled to an I/O connector socket portion 38a mounted on the inner side of the board and configured to complementarily and removably receive the connector edge portion 38 of the riser card 16 to thereby electrically couple the I/O connectors 52-62 to the I/O cards and cables 35,36.

Socket portions of connectors 52-62 are complementarily received in openings (not visible) formed in a molded plastic I/O output bracket member 64 transversely secured along a side edge thereof to an end of the mounting plate 40. Bracket member 64 has an elongated, generally rectangular configuration, is exteriorly coated with an electrically conductive material and, for purposes later described, has a peripheral groove 66 extending along its opposite ends and side edge 68 as best illustrated in FIG. 2.

The system planar board 42 is removably secured to the inner side of the removable mounting plate 40 by means of a single mounting screw 70, a spaced series of hooks 72 formed on the inner side of the mounting plate 40, a spaced series of slots 74 formed in the planar board 42, a circular opening 76 formed in the planar board 42, and a circular opening 78 formed in the mounting plate 40. To removably secure the system planar board 42 to the inner side of the mounting plate 40, the hooks 72 are extended through the board slots 74 and the board 42 is then moved toward the I/O bracket 64 to cause the aforementioned socket portions of the I/O connectors 54-64 to enter the complementarily configured openings in the bracket 64. At this point the planar board and mounting plate holes 76,78 are brought into registry with one another. The single mounting screw 70 is then outwardly extended through the planar board hole 76 and threaded into the mounting plate hole 78 to captively retain the planar board on the mounting plate.

With the planar board 42 removably secured to its inner side as described above, the mounting plate portion of the planar subassembly 18 is removably secured to the chassis portion by visually aligning the mounting plate holes 44 with the holes in the chassis tabs 50 (thereby aligning the riser card connector edge 38 with the planar board I/O connector socket 38a), and then inwardly pushing the mounting plate 40 toward the connector edge portion 38.

This inward connecting movement of the mounting plate 40 causes the connector edge portion 38 of the riser card 16 to be operatively plugged into the planar board I/O connector socket 38a. It also caused a peripheral wall edge portion of the chassis wall cutout area 32 to enter the I/O output bracket groove 66 to form therewith a labyrinth EMI seal S (see FIG. 4) at the juncture between the chassis wall 22 and the I/O output bracket 64.

With the card edge connector portion 38 inserted into the planar board I/O connector socket 38a as described, the mounting plate 40 is fastened to the chassis tabs using the four screws 48, thereby completing the operative coupling of the system planar board 42 to the balance of the computer system within the overall chassis structure.

If it subsequently becomes necessary to remove and replace the planar board 42, all that is required is to remove the four screws 48, thereby freeing the mounting plate 40, and then outwardly pulling on the mounting plate to unplug the riser card connector edge portion 38 (see FIG. 2) from its associated planar board socket 38a. This simple and quite rapid removal of the planar board 42 does not in any manner disturb or require the disconnection of any of the I/O cards and cables 35,36 which would normally be plugged directly into the planar board. These components remain in place on the chassis.

In addition to greatly accelerating the planar board removal process, the elimination of the necessity of separately disconnecting, and then reconnecting, the cards and cables 35,36 also eliminates the possibility of replacing cards in improper slots, or miscabling after the removed planar board is replaced with a new one.

After the mounting plate 40 has been removed, the single screw 70 is removed to free the removed planar board 42 which may be quickly replaced with a new planar board secured to the mounting plate 40 with the screw 70. The mounting plate is then reconnected to the chassis as previously described to rapidly couple the new planar board to the balance of the computer system using the plug-in connection between the riser card connection edge 38 and its associated I/O connector socket on the new planar board.

Since the planar board 42 is not buried under a layered mass of cards and cabling directly connected thereto, but may removed without disturbing the I/O cards and cables 35 and 36, the planar removal and replacement process may be easily carried out in a couple minutes instead of taking twenty to thirty minutes or more as is typically the case when the planar board is conventionally coupled to the balance of the computer system within the chassis. As will be readily appreciated, this substantially increases the manufacturability, serviceability and uptime of the computer.

The foregoing detailed description is to be clearly understood as being given by way of illustration and example only, the spirit and scope of the present invention being limited solely by the appended claims.

What is claimed is:

1. Computer apparatus comprising:
a chassis structure having a mounting portion thereon;
a riser card fixedly supported on said chassis structure mounting portion, said riser card having a plurality of I/O connector sockets thereon, into which a plurality of I/O cards may be removably plugged, and further having a connector edge portion through which electrical signals may be transmitted to and from said riser card;
a system planar board having an I/O connector socket mounted on a side thereof and removably receiving said riser card connector edge portion to electrically couple said system planar board to I/O cards received in the connector sockets of said fixedly supported riser card;
a mounting plate removably secured to said chassis structure mounting portion at a location thereon permitting said mounting plate to be outwardly pulled away therefrom to effect the uncoupling of said riser card connector edge portion from said system planar board I/O connector socket;
a plurality of I/O connector devices, mounted on said system planar board, to which external peripheral devices may be connected; and
an I/O output bracket member mounted on said system planar board, said I/O output bracket member having openings therein which receive portions of said I/O connector devices, said I/O output bracket member further having a peripheral groove therein, said groove removably receiving a wall edge section of said chassis structure and forming therewith a labyrinth EMI seal,
said system planar board being removably secured to a side of said mounting plate,
said system planar board being removably supported on said chassis structure mounting portion and being disconnectable from said riser card, and thus from any I/O cards received in its connector socket, by moving said system planar board away from said chassis structure mounting portion in a manner withdrawing said riser card connector edge portion from said system planar board I/O connector socket.

2. The computer apparatus of claim 1 wherein:
said computer system portion includes card edge connector means through which electrical signals may be transmitted to and from said computer system portion, and
said cooperating means including said card edge connector means and socket means into which said card edge connector means may be removably plugged in response to moving said system planar board toward said chassis portion, said socket means being located on said system planar board.

3. The computer apparatus of claim 2 wherein:
said card edge connector means are defined by a single connector edge portion of said computer system portion, and
said socket means are defined by a single connector socket mounted on said system planar board.

4. The computer apparatus of claim 3 wherein:
said computer system portion includes a riser card having connector sockets mounted thereon into which I/O cards may be plugged, and
said single connector edge portion is disposed on said riser card.

5. The computer apparatus of claim 4 wherein:
said single connector socket mounted on said system planar board is an I/O connector socket.

6. A method of constructing a computer system comprising the steps of:

providing a chassis structure having a mounting portion thereon;

fixedly supporting a riser card on said chassis structure mounting portion, said riser card having a plurality of I/O connector sockets thereon, into which a plurality of I/O cards may be plugged, and further having a connector edge portion through which electrical signals may be transmitted to and from said riser card;

providing a system planar board having an I/O connector socket on a side thereof;

securing said system planar board to a mounting plate, said step of securing said system planar board to a mounting plate further comprising the steps of:

forming mounting hook projections on a side of said mounting plate;

operatively extending said mounting hook projections through slots in said system planar board; and removably securing said system planar board to said mounting plate with a screw;

operatively coupling said system planar board to said riser card by moving said system planar board toward said chassis structure mounting portion in a manner causing said riser card connector edge portion to removably plug into said system planar board I/O connector socket; and removably securing said mounting plate to said chassis structure mounting portion in a manner captively retaining said system planar board in an operatively coupled relationship with said riser card, the operatively coupled system planar board being subsequently disconnectable from the fixedly supported riser card, and thus from any I/O cards plugged into its connector sockets, by moving said system planar board away from said chassis structure mounting portion in a manner withdrawing said riser card connector edge portion from said system planar board I/O connector socket.

7. A computer system constructed by the method of claim 6.

8. The method of claim 6 wherein:

said system planar board has mounted thereon a plurality of I/O connector devices to which external peripheral devices may be connected, said method further comprises the step of securing an I/O output bracket member to said system planar board, said I/O output bracket member having openings therein which receive portions of said I/O connector devices, said I/O output bracket member further having a peripheral groove therein, and said operatively coupling step is performed in a manner causing a wall edge portion of said chassis to enter said I/O output bracket groove in a manner forming therewith a labyrinth EMI seal area.

9. A computer system constructed by the method of claim 8.

10. A method of constructing a computer system comprising the steps of:

providing a chassis structure having a mounting portion thereon;

fixedly supporting a riser card on said chassis structure mounting portion, said riser card having a plurality of I/O connector sockets thereon, into which a plurality of I/O cards may be plugged, and further having a connector edge portion through which electrical signals may be transmitted to and from said riser card;

providing a system planar board having an I/O connector socket on a side thereof and having mounted thereon a plurality of I/O connector devices to which external peripheral devices may be connected;

securing an I/O bracket member to said system planar board, said I/O output bracket member having openings therein which receive portions of said I/O connector devices, said I/O output bracket member further having a peripheral groove therein;

securing said system planar board to a mounting plate;

operatively coupling said system planar board to said riser card by moving said system planar board toward said chassis structure mounting portion in a manner causing said riser card connector edge portion to removably plug into said system planar board I/O connector socket, wherein said operatively coupling step is performed in a manner causing a wall edge portion of said chassis to enter said I/O output bracket groove in a manner forming therewith a labyrinth EMI seal area; and removably securing said mounting plate to said chassis structure mounting portion in a manner captively retaining said system planar board in an operatively coupled relationship with said riser card, the operatively coupled system planar board being subsequently disconnectable from the fixedly supported riser card, and thus from any I/O cards plugged into its connector sockets, by moving said system planar board away from said chassis structure mounting portion in a manner withdrawing said riser card connector edge portion from said system planar board I/O connector socket.

11. A computer system constructed by the method of claim 10.

* * * * *